US012387388B2

(12) United States Patent
Gafni et al.

(10) Patent No.: US 12,387,388 B2
(45) Date of Patent: Aug. 12, 2025

(54) SCENE-BASED TEXT-TO-IMAGE GENERATION WITH HUMAN PRIORS

(71) Applicant: Meta Platforms, Inc., Menlo Park, CA (US)

(72) Inventors: Oran Gafni, Ramat Gan (IL); Adam Polyak, Tel Aviv (IL); Yaniv Nechemia Taigman, Raanana (IL)

(73) Assignee: Meta Platforms, Inc., Menlo Park, CA (US)

( * ) Notice: Subject to any disclaimer, the term of this patent is extended or adjusted under 35 U.S.C. 154(b) by 74 days.

(21) Appl. No.: 18/149,542

(22) Filed: Jan. 3, 2023

(65) Prior Publication Data

US 2024/0221235 A1    Jul. 4, 2024

(51) Int. Cl.
| | |
|---|---|
| *G06T 11/00* | (2006.01) |
| *G06T 7/13* | (2017.01) |
| *G06T 9/00* | (2006.01) |
| *G06V 10/82* | (2022.01) |
| *H04L 9/32* | (2006.01) |

(52) U.S. Cl.
CPC .............. *G06T 11/00* (2013.01); *G06T 7/13* (2017.01); *G06T 9/00* (2013.01); *G06V 10/82* (2022.01); *H04L 9/3213* (2013.01); *G06T 2207/30201* (2013.01)

(58) Field of Classification Search
CPC ... G06T 11/00; G06T 7/13; G06T 9/00; G06T 2207/30201; G06V 10/82; H04L 9/3213
See application file for complete search history.

(56) References Cited

U.S. PATENT DOCUMENTS

| | | | |
|---|---|---|---|
| 2010/0231938 A1* | 9/2010 | Ohguro | G06F 40/103 358/1.9 |
| 2011/0002541 A1* | 1/2011 | Varekamp | G06T 7/136 382/173 |
| 2019/0149834 A1* | 5/2019 | Zhou | H04N 19/187 348/473 |
| 2022/0014807 A1* | 1/2022 | Lin | G06V 20/635 |
| 2022/0246052 A1* | 8/2022 | Smith Lewis | G09B 7/07 |

OTHER PUBLICATIONS

Tao Xu, "AttnGAN: Fine-Grained Text to Image Generation With Attentional Generative Adversarial Networks" Proceedings of the IEEE Conference on Computer Vision and Pattern Recognition (CVPR), 2018, pp. 1316-1324 (Year: 2018).*
Oran Gafni, "Make-A-Scene: Scene-Based Text-to-Image Generation with Human Priors" arXiv, 2022, pp. 1-17 (Year: 2022).*

(Continued)

*Primary Examiner* — Terrell M Robinson
(74) *Attorney, Agent, or Firm* — Seyfarth Shaw LLP

(57) ABSTRACT

In one embodiment, a method includes accessing a text input and a scene input corresponding to the text input, wherein the scene input comprises semantic segmentations, generating text tokens for the text input and scene tokens for the scene input by machine-learning models, generating predicted image tokens based on the text tokens and the scene tokens by the machine-learning models, and generating an image corresponding to the text input and the scene input based on the predicted image tokens by the machine-learning models.

17 Claims, 15 Drawing Sheets

(56) References Cited

OTHER PUBLICATIONS

Al-Rfou R., et al., "Character-Level Language Modeling with Deeper Self-Attention," arXiv:1808.04444, Dec. 10, 2018, 8 pages.
Ba J.L., et al., "Layer Normalization," arXiv preprint arXiv: 1607.06450, Jul. 21, 2016, 14 pages.
Britz D., et al. "Efficient Attention Using a Fixed-Size Memory Representation," Jul. 1, 2017, 9 pages, Retrieved from the Internet: URL: https://arxiv.org/pdf/1707.00110.pdf.
Chen T., et al., "Training Deep Nets with Sublinear Memory Cost," arXiv:1604.06174, Apr. 22, 2016, 12 pages.
Chen X., et al., "PixelSNAIL: An Improved Autoregressive Generative Model," arXiv:1712.09763, Dec. 28, 2017, 6 pages.
Chiu C-C., et al., "Monotonic Chunkwise Attention," arXiv:1712.05382, Dec. 14, 2017, 13 pages.
Dai Z., et al., "Transformer-XL: Language Modeling with Longer-Term Dependency," International Conference on Learning Representations (ICLR), Sep. 27, 2018, 16 pages.
Dieleman S., et al., "The Challenge of Realistic Music Generation: Modelling Raw Audio At Scale," Sound, Jun. 26, 2018, pp. 1-13.
Gehring J., et al., "Convolutional Sequence to Sequence Learning," arXiv preprint, arXiv: 1705.03122, Jul. 25, 2017, 15 pages.
Gruslys A., et al., "Memory-Efficient Backpropagation through Time," Advances in Neural Information Processing Systems (NIPS), Dec. 5, 2016, pp. 4125-4133.
He K., et al., "Identity Mappings in Deep Residual Networks," In European Conference on Computer Vision, Springer, Cham, Oct. 8, 2016, 15 Pages.
Hendrycks D., et al., "Bridging Nonlinearities and Stochastic Regularizers with Gaussian Error Linear Units," International Conference on Learning Representations (ICLR), Jul. 8, 2016, pp. 1-7.
Huang Cza., et al., "An Improved Relative Self-Attention Mechanism for Transformer with Application to Music Generation," arXiv:1809.04281, Sep. 12, 2018, 11 pages.
Jozefowicz R "Exploring the Limits of Language Modeling," arXiv:1602.02410, Feb. 11, 2016, 11 pages.
Kingma D.P., et al., "Glow: Generative flow with Invertible 1x1 Convolutions," Advances in Neural Information Processing Systems (NIPS), Jul. 2018, pp. 10236-10245.
Koutnik J., et al., "A Clockwork RNN," arXiv:1402.3511, Feb. 14, 2014, 9 pages.
Liu P.J., et al., "Generating Wikipedia by Summarizing Long Sequences," arXiv preprint arXiv:1801.10198, Jan. 30, 2018, 18 pages.
Mehri S., et al., "SampleRNN: An Unconditional End-to-End Neural Audio Generation Model," arXiv:1612.07837, Dec. 22, 2016, 11 pages.
Menick J., et al., "Generating High Fidelity Images with Subscale Pixel Networks and Multidimensional Upscaling," arXiv:1812.01608, Dec. 4, 2018, 15 pages.
Micikevicius P., et al., "Mixed Precision Training," arXiv:1710.03740, Oct. 12, 2017, 14 pages.
Oord A.V.D., et al., "WaveNet: A Generative Model for Raw Audio," arXiv preprint, arXiv: 1609.03499, Sep. 19, 2016, pp. 1-15.
Parmar N., et al., "Image Transformer," Proceedings of the 35th International Conference on Machine Learning (ICML), Jun. 15, 2018, PMLR 80, pp. 4055-4064.
Radford A., et al., "Improving Language Understanding by Generative Pre-Training," Nov. 20, 2018, 12 pages.
Reed S., et al., "Parallel Multiscale Autoregressive Density Estimation," arXiv preprint arXiv:1703.03664v1, Mar. 10, 2017, 16 pages.
Salimans T., et al., "PixelCNN++: Improving the PixelCNN with Discretized Logistic Mixture Likelihood and Other Modifications," arXiv preprint arXiv: 1701.05517, Jan. 19, 2017, 10 pages.
Sukhbaatar S., et al., "End-to-End Memory Networks," Advances in Neural Information Processing Systems, Nov. 24, 2015, 9 Pages.
Van Der Oord. A., et al., "Pixel Recurrent Neural Networks," arXiv preprint arXiv:1601.06759v3, Aug. 19, 2016, 11 pages.
Vaswani A., et al., "Attention Is All You Need," Advances in Neural Information Processing Systems, December (NIPS), Dec. 4, 2017, pp. 5998-6008.

\* cited by examiner

SCENE-BASED TEXT-TO-IMAGE GENERATION WITH HUMAN PRIORS

TECHNICAL FIELD

This disclosure generally relates to text-to-image generation, and in particular relates to machine learning for text-to-image generation.

BACKGROUND

A text-to-image model is a machine-learning model which takes as input a natural language description and produces an image matching that description. Text-to-image models generally combine a language model, which transforms the input text into a latent representation, and a generative image model, which produces an image conditioned on that representation. The most effective models have generally been trained on massive amounts of image and text data scraped from the web.

SUMMARY OF PARTICULAR EMBODIMENTS

In particular embodiments, a computing system may use a model for generating images from text, with the model being based on a text encoder, a scene encoder, an image encoder/decoder, and a transformer. To train the transformer, text, scene/sketch, and ground-truth image may be firstly encoded into tokens using the text encoder, the scene encoder, and the image encoder, respectively. Text tokens may each correspond to a word or a combination of letters. Scene tokens may each correspond to a patch in the scene. Image tokens may each correspond to a representation of a patch in the ground truth image. These tokens may be input to the transformer, which may generate output image tokens that can be evaluated for optimizing the transformer. During inference time, text tokens for an input text and scene tokens for an input scene/sketch may be generated and then input into the trained transformer or generated independently by the trained transformer. The transformer may then output image tokens that are further decoded using the image decoder to generate the image corresponding to the input text and scene. Besides image generation from text, the model may result in several additional capabilities including scene editing, text editing with anchor scenes, overcoming out-of-distribution text prompts, and enabling storytelling illustration generation. Although this disclosure describes generating particular images in a particular manner, this disclosure contemplates generating any suitable image in any suitable manner.

In particular embodiments, the computing system may access a text input and a scene input corresponding to the text input. The scene input may comprise one or more semantic segmentations. In particular embodiments, the computing system may then generate, by one or more machine-learning models, one or more text tokens for the text input and one or more scene tokens for the scene input. The computing system may then generate, based on the one or more text tokens and the one or more scene tokens by the one or more machine-learning models, one or more predicted image tokens. In particular embodiments, the computing system may further generate, based on the one or more predicted image tokens by the one or more machine-learning models, an image corresponding to the text input and the scene input.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
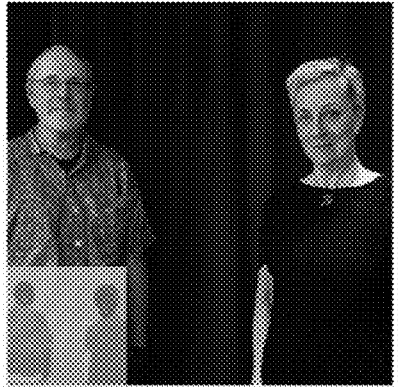
FIG. 1A illustrates example images generated from text inputs.
Figure 1A:
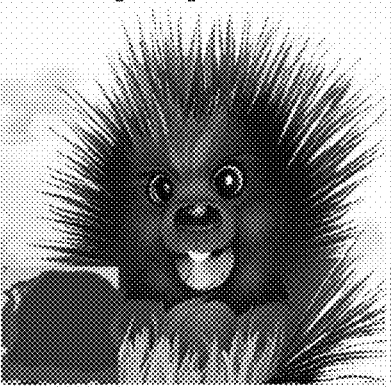
Figure 1A:
Figure 1A:
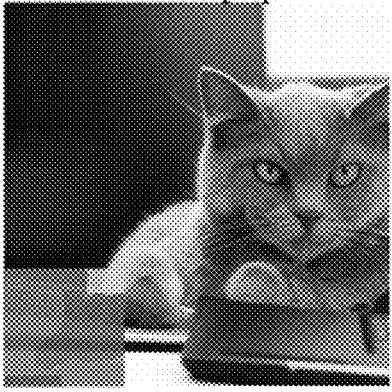
Figure 1A:
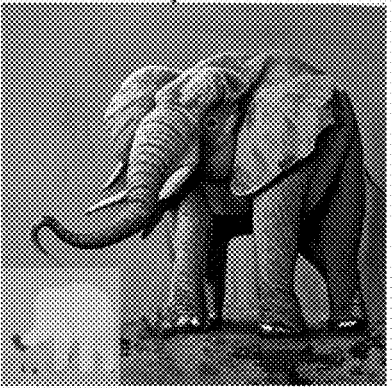
Figure 1A:

In particular embodiments, a computing system may use a model for generating images from text, with the model being based on a text encoder, a scene encoder, an image encoder/decoder, and a transformer. To train the transformer, text, scene/sketch, and ground-truth image may be firstly encoded into tokens using the text encoder, the scene encoder, and the image encoder, respectively. Text tokens may each correspond to a word or a combination of letters. Scene tokens may each correspond to a patch in the scene. Image tokens may each correspond to a representation of a patch in the ground truth image. These tokens may be input to the transformer, which may generate output image tokens that can be evaluated for optimizing the transformer. During inference time, text tokens for an input text and scene tokens for an input scene/sketch may be generated and then input into the trained transformer or generated independently by the trained transformer. The transformer may then output image tokens that are further decoded using the image decoder to generate the image corresponding to the input text and scene. Besides image generation from text, the model may result in several additional capabilities including scene editing, text editing with anchor scenes, overcoming out-of-distribution text prompts, and enabling storytelling illustration generation. Although this disclosure describes generating particular images in a particular manner, this disclosure contemplates generating any suitable image in any suitable manner.

In particular embodiments, the computing system may access a text input and a scene input corresponding to the text input. The scene input may comprise one or more semantic segmentations. In particular embodiments, the computing system may then generate, by one or more machine-learning models, one or more text tokens for the text input and one or more scene tokens for the scene input. The computing system may then generate, based on the one or more text tokens and the one or more scene tokens by the one or more machine-learning models, one or more predicted image tokens. In particular embodiments, the computing system may further generate, based on the one or more predicted image tokens by the one or more machine-learning models, an image corresponding to the text input and the scene input.

Recent text-to-image generation methods may provide a simple yet exciting conversion capability between text and image domains. While these methods have incrementally improved the generated image fidelity and text relevancy, several pivotal gaps remain unanswered, limiting applicability and quality. The embodiments disclosed herein present a novel text-to-image method that addresses these gaps by (i) enabling a simple control mechanism complementary to text in the form of a scene, (ii) introducing elements that substantially improve the tokenization process by employing domain-specific knowledge over key image regions (faces and salient objects), and (iii) adapting classifier-free guidance for the transformer use case. Our model may achieve state-of-the-art FID and human evaluation results, unlocking the ability to generate high fidelity images in a resolution of 512×512 pixels, or in a resolution of 2048× 2048 pixels by using a super-resolution network, significantly improving visual quality. Through scene controllability, the model may introduce several new capabilities: (i) scene editing, (ii) text editing with anchor scenes, (iii) overcoming out-of-distribution text prompts, and (iv) enabling storytelling illustration generation.

"A poet would be overcome by sleep and hunger before being able to describe with words what a painter is able to depict in an instant." Similar to this quote by Leonardo da Vinci, equivalents of the expression "A picture is worth a thousand words" have been iterated in different languages and eras, alluding to the heightened expressiveness of images over text, from the human perspective. There may be no surprise then, that the task of text-to-image generation has been gaining increased attention with the recent success of text-to-image modeling via large-scale models and datasets. This new capability of effortlessly bridging between the text and image domains may enable new forms of creativity to be accessible to the general public.

While conventional methods may provide a simple yet exciting conversion between the text and image domains, they may still lack several pivotal aspects:

(i) Controllability. The sole input accepted by the majority of conventional models may be text, confining any output to be controlled by a text description only. While certain perspectives may be controlled with text, such as style or color, others such as structure, form, or arrangement may only be loosely described at best. This lack of control may convey a notion of randomness and weak user-influence on the image content and context. Controlling elements additional to text have been suggested, yet their use may be confined to restricted datasets such as fashion items or faces. An earlier work suggested coarse control in the form of bounding boxes resulting in low resolution images.

(ii) Human perception. While images are generated to match human perception and attention, the generation process may not include any relevant prior knowledge, resulting in little correlation between generation and human attention. A clear example of this gap may be observed in person and face generation, where a dissonance may be present between the importance of face pixels from the human perspective and the loss applied over the whole image. This gap may be relevant to animals and other salient objects as well.

(iii) Quality and resolution. Although quality has gradually improved between consecutive methods, the previous state-of-the-art methods may be still limited to an output image resolution of 256×256 pixels. Alternative approaches propose a super-resolution network which may result in less favorable visual and quantitative results. Quality and resolution may be strongly linked, as scaling up to a resolution of 512×512 may require a substantially higher quality with fewer artifacts than 256×256.

The embodiments disclosed herein introduce a novel method that may successfully tackle these pivotal gaps, while attaining state-of-the-art results in the task of text-to-image generation. Our method may provide a new type of control complementary to text, enabling new-generation capabilities while improving structural consistency and quality. Furthermore, the embodiments disclosed herein present explicit losses correlated with human preferences, significantly improving image quality, breaking the common resolution barrier, and thus producing results in a resolution of 512×512 pixels, or 2048×2048 with a super-resolution network.

Our method may comprise an autoregressive transformer, where in addition to the conventional use of text and image tokens, we may introduce implicit conditioning over optionally controlled scene tokens, derived from segmentation maps. During inference, the segmentation tokens may be either generated independently by the transformer or extracted from an input image, providing freedom to impel additional constraints over the generated image. Contrary to the common use of segmentation for explicit conditioning as employed in many GAN-based methods, our segmentation tokens may provide implicit conditioning in the sense that the generated image and image tokens may be not constrained to use the segmentation information, as there may be no loss tying them together. In practice, this may contribute to the variety of samples generated by the model, producing diverse results constrained to the input segmentations.

The embodiments disclosed herein demonstrate the new capabilities this method may provide in addition to controllability, such as (i) complex scene generation, (ii) out-of-distribution generation, (iii) scene editing, and (iv) text editing with anchored scenes. The embodiments disclosed herein additionally provide an example of harnessing controllability to assist with the creative process of storytelling in the supplementary materials.

While most conventional approaches may rely on losses agnostic to human perception, our method may differ in that respect. Our method may use two modified Vector-Quantized Variational Autoencoders (VQ-VAE) to encode and decode the image and scene tokens with explicit losses targeted at specific image regions correlated with human perception and attention, such as faces and salient objects. The losses may contribute to the generation process by emphasizing the specific regions of interest and integrating domain-specific perceptual knowledge in the form of network feature-matching.

While some conventional methods may rely on image re-ranking for post-generation image filtering (utilizing CLIP for instance), our method may extend the use of classifier-free guidance suggested for diffusion models to transformers, eliminating the need for post-generation filtering, thus producing faster and higher quality generation results, better adhering to input text prompts.

Figure 1B:
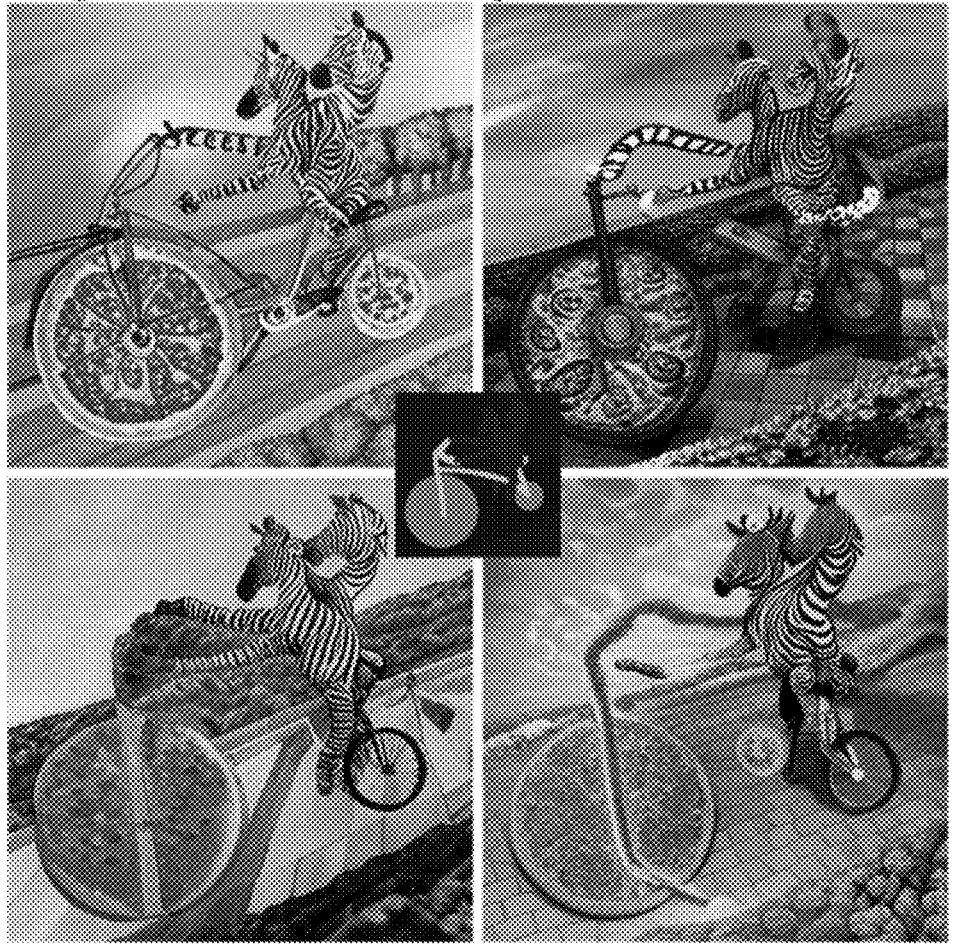
FIG. 1B illustrates example images generated from a text and scene input.

Our model may generate an image given a text input and an optional scene layout (segmentation map). In particular embodiments, the computing system may generate the one or more semantic segmentations from an existing image. In particular embodiments, the one or more semantic segmentations may be created by a user, e.g., a user sketch. FIG. 1A illustrates example images generated from text inputs. FIG. 1B illustrates example images generated from a text and scene input. Our method may be able to both generate the scene (FIG. 1A, bottom left) and image, or generate the image from text and a simple sketch input (FIG. 1B, center). As demonstrated in the experiments, by conditioning over the scene layout, our method may provide a new form of implicit controllability, improve structural consistency and quality, and adhere to human preference (as assessed by our human evaluation study). In addition to our scene-based approach, the embodiments disclosed herein extended our aspiration of improving the general and perceived quality with a better representation of the token space. The embodiments disclosed herein introduce several modifications to the tokenization process, emphasizing awareness of aspects with increased importance in the human perspective, such as faces and salient objects. To refrain from post-generation filtering and further improve the generation quality and text alignment, we may employ classifier-free guidance.

Figure 2:
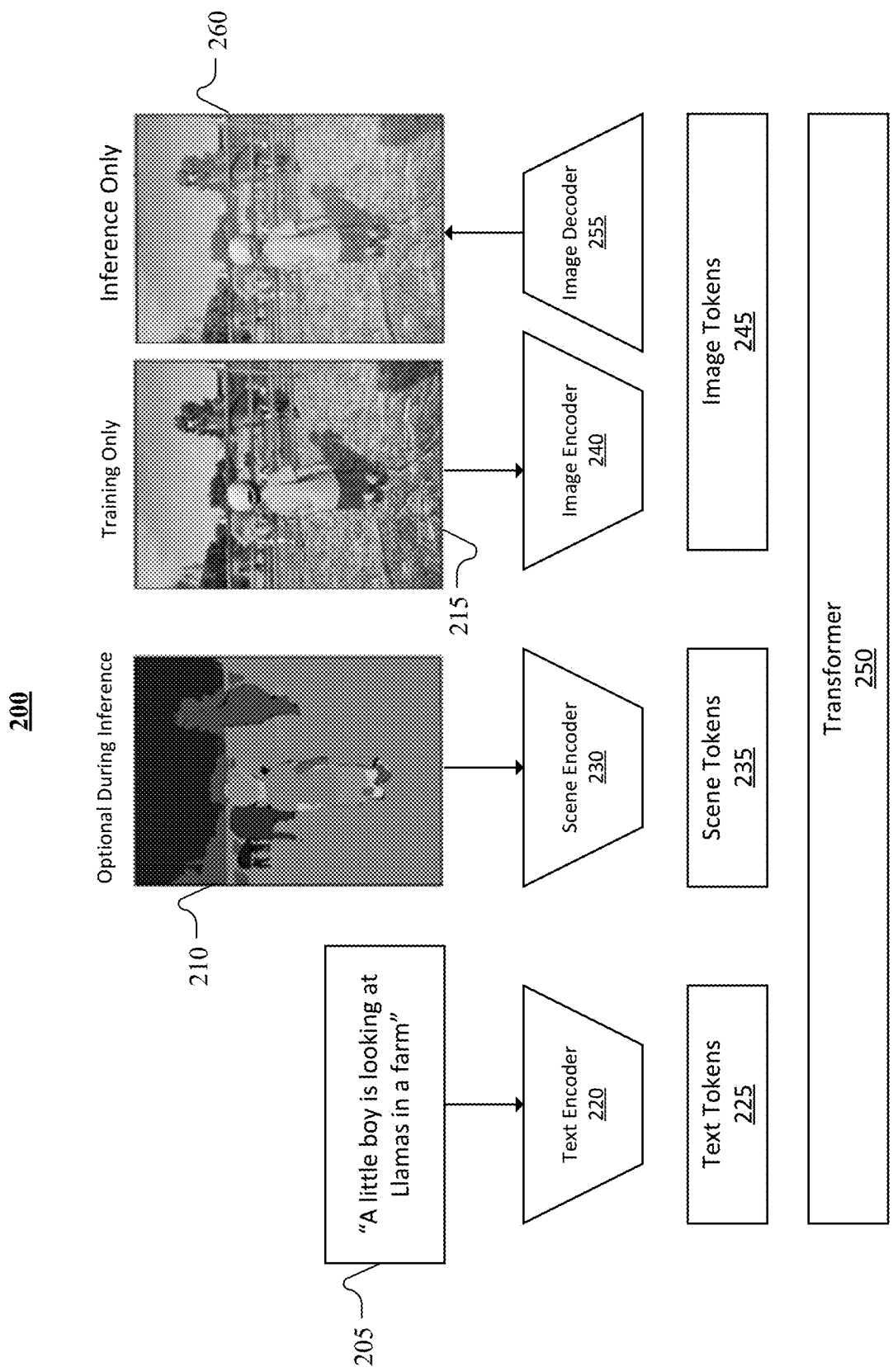
FIG. 2 illustrate an example architecture of our model.

FIG. 2 illustrate an example architecture 200 of our model. In particular embodiments, the one or more machine-learning models may comprise one or more of a text encoder, a scene encoder, an image encoder, a transformer neural network model, or an image decoder. In particular embodiments, for training, the training data may comprise text 205, scene 210, and ground-truth image 215. A text encoder 220 may generate text tokens 225 from the text 205. A scene encoder 230 may generate scene tokens 235 from the scene 210. An image encoder 240 may generate image tokens 245 from the image 215. These tokens may be input to a transformer 250 (e.g., an auto-regressive transformer), which may predict image tokens. During the training, the transformer 250 may compare the predicted image tokens with the ground-truth image tokens 245 based on loss functions. The transformer 250 may then update itself based on the comparison. In particular embodiments, for inference, a user may input to our model a text 205, and optionally a scene 210. The text encoder 220 may generate text tokens 225 from the input text 205. If there is an input scene 210, the scene encoder 230 may generate scene tokens 235 from the input scene 210. The transformer 250 may then predict image tokens 245 based on the text tokens 225 and scene tokens 235 (if there is an input scene 210). The predicted image tokens 245 may be provided to an image decoder 255. The image decoder 255 may further generate the image 260 for the inference.

A detailed overview of our method is described below, comprising (i) scene representation and tokenization, (ii) attending human preference in the token space with explicit losses, (iii) the scene-based transformer, and (iv) transformer classifier-free guidance. Aspects commonly used prior to our method may be not extensively detailed below.

The scene may be composed of a union of three complementary semantic segmentation groups—panoptic, human, and face. In particular embodiments, the one or more semantic segmentations may be associated with one or more categories based on one or more of panoptic, human, or face. By combining the three extracted semantic segmentation groups, the network may learn to both generate the semantic layout and condition on it while generating the final image. The semantic layout may provide additional global context in an implicit form that correlates with human preference, as the choice of categories within the scene groups, and the choice of the groups themselves are a prior to human preference and awareness. We may consider this form of conditioning to be implicit, as the network may disregard any scene information, and generate the image conditioned solely on text. Our experiments indicate that both the text and scene may firmly control the image.

In order to create the scene token space, we may employ VQ-SEG: a modified VQ-VAE for semantic segmentation, building on the VQ-VAE suggested for semantic segmentation. In particular embodiments, the one or more scene tokens may be based on a plurality of channels. A number of the plurality of channels may be based on a number of categories based on panoptic, a number of categories based on human, a number of categories based on face, and an edge channel corresponding to a map of edges separating the one or more semantic segmentations. In our implementation the inputs and outputs of VQ-SEG may be m channels, representing the number of classes for all semantic segmentation groups $m=m_p+m_h+m_f+1$, where $m_p$, $m_h$, $m_f$ are the number of categories for the panoptic segmentation, human segmentation, and face segmentation respectively. The additional channel may be a map of the edges separating the different classes and instances. The edge channel may provide both separations for adjacent instances of the same class, and emphasis on scarce classes with high importance, as edges (perimeter) may be less biased towards larger categories than pixels (area).

We observe an inherent upper-bound on image quality when generating images with the transformer, stemming from the tokenization reconstruction method. In other words, quality limitations of the VQ image reconstruction method may inherently transfer to quality limitations on images generated by the transformer. To that end, the embodiments disclosed herein introduce several modifications to both the segmentation and image reconstruction methods. These modifications may comprise losses in the form of emphasis (specific region awareness) and perceptual knowledge (feature-matching over task-specific pre-trained networks).

While using a scene as an additional form of conditioning provides an implicit prior for human preference, we may institute explicit emphasis in the form of additional losses, explicitly targeted at specific image regions. We may employ a feature-matching loss over the activations of a pre-trained face-embedding network, introducing "awareness" of face regions and additional perceptual information, motivating high-quality face reconstruction.

In particular embodiments, generating the one or more predicted image tokens may be based on an image encoder and generating the image corresponding to the text input and the scene input may be based on an image decoder. In particular embodiments, the image encoder or decoder may be trained based on a feature-matching loss over activations of a pre-trained face-embedding network comparing between reconstructed face crops and ground-truth face crops.

Figure 3:
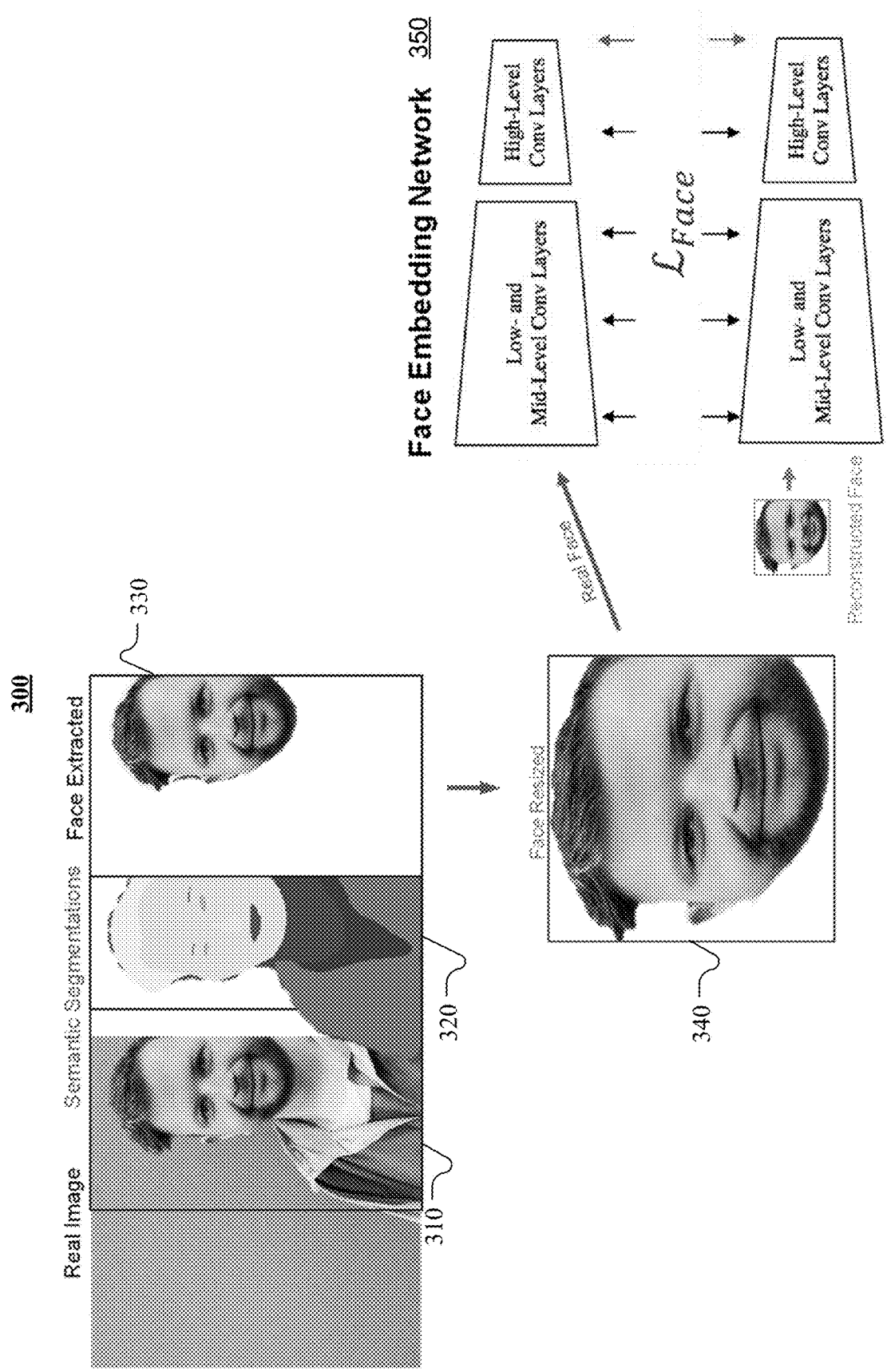
FIG. 3 illustrates an example process for employing domain specific knowledge over key image regions of faces.

FIG. 3 illustrates an example process 300 for employing domain specific knowledge over key image regions of faces. Before training the face-aware VQ (denoted as VQ-IMG), faces may be located using the semantic segmentation information extracted for VQ-SEG. As shown in FIG. 3, based on real image 310 and semantic segmentations 320, we may get a face extracted 330. The extracted face may be further resized 340. The face locations may be then used during the face-aware VQ training stage, running up to $k_f$ faces per image from the ground-truth and reconstructed images through the face-embedding network. The face loss may then be formulated as following:

$$\mathcal{L}_{Face} = \sum_k \sum_l \alpha_f^l \left\| FE^l(\hat{c}_o^k) - FE^l(c_f^k) \right\|, \quad (1)$$

where the index I is used to denote the size of the spatial activation at specific layers of the face embedding network FE, while the summation may run over the last layers of each block of size 112×112, 56×56, 28×28, 7×7, 1×1 (1×1 being the size of the top most block), $\hat{c}_o^k$ and $c_o^k$ are respectively the reconstructed and ground-truth face crops k out of kf faces in an image, $\alpha_f^i$ is a per-layer normalizing hyperparameter, and $\mathcal{L}_{Face}$ is the face loss added to the VQGAN losses. As shown in FIG. 3, the real face may be input to the low- and mid-level convolutional layers and high-level convolutional layers of a face embedding network 350. The reconstructed face may be input to the low- and mid-level convolutional layers and high-level convolutional layers of the face embedding network 350. The two branches may be compared based on Equation (1).

While training the VQ-SEG network, we observe a frequent reduction of the semantic segmentations representing the face parts (such as the eyes, nose, lips, eyebrows) in the reconstructed scene. This effect may be not surprising due to the relatively small number of pixels that each face part accounts for in the scene space. A straightforward solution may be to employ a loss more suitable for class imbalance, such as focal loss. However, we may not aspire to increase the importance of classes that are both scarce, and of less importance, such as fruit or a tooth-brush. Instead, the embodiments disclosed herein (1) employ a weighted binary cross-entropy face loss over the segmentation face parts classes, emphasizing higher importance for face parts, and (2) include the face parts edges as part of the semantic segmentation edge map mentioned above. In particular embodiments, generating the one or more semantic segmentations may be based on a segmentation model. The segmentation model may be trained based on one or more of a weighted binary cross-entropy face loss applied over segmentation face parts categories or a semantic segmentation edge map comprising face parts edges. The weighted binary cross-entropy loss may then be formulated as following:

$$\mathcal{L}_{WBCE} = \alpha_{cat} BCE(s, \hat{s}), \quad (2)$$

where s and ŝ are the input and reconstructed segmentation maps respectively, $\alpha_{cat}$ is a per-category weight function, BCE is a binary cross-entropy loss, and LWBCE is the weighted binary cross-entropy loss added to the conditional VQ-VAE losses.

The embodiments disclosed herein generalize and extend the face-aware VQ method to increase awareness and perceptual knowledge of objects defined as "things" in the panoptic segmentation categories. In particular embodiments, the image encoder or decoder may be trained based on a feature-matching loss over activations of a pre-trained object-recognition network comparing between reconstructed object crops and ground-truth object crops. Rather than a specialized face-embedding network, we may employ a pre-trained VGG network trained on a public image dataset, and introduce a feature-matching loss representing the perceptual differences between the object crops of the reconstructed and ground-truth images. By running the feature-matching over image crops, we may be able to increase the output image resolution from 256×256 by simply adding to VQ-IMG an additional down-sample and up-sample layer to the encoder and decoder respectively. Similarly to Eq. 1, the loss may be formulated as:

$$\mathcal{L}_{Obj} = \sum_k \sum_l \alpha_o^l \left\| VGG^l(\hat{c}_o^k) - VGG^l(\hat{c}_o^k) \right\|, \quad (3)$$

where $\hat{c}_o^k$ and $c_o^k$ are the reconstructed and input object crops respectively, VGG' are the activations of the l-th layer from the pre-trained VGG network, $\alpha_o^l$ is a per-layer normalizing hyperparameter, and $\mathcal{L}_{Obj}$ is the object-aware loss added to the VQ-IMG losses defined in Eq. 1.

The method may rely on an autoregressive transformer with three independent consecutive token spaces: text, scene, and image. The token sequence may comprise $n_x$ text tokens encoded by a BPE encoder, followed by $n_y$ scene tokens encoded by VQ-SEG, followed by $n_z$ image tokens encoded and decoded by VQ-IMG.

Prior to training the scene-based transformer, each encoded token sequence corresponding to a [text, scene, image] triplet is extracted using the corresponding encoder, producing a sequence that consists of:

$$t_x, t_y, t_z = BPE(i_x), VQ-SEG(i_y), VQ-IMG(i_z), \quad (4)$$

$$t = [t_x, t_y, t_z], \quad (5)$$

where $i_x$, $i_y$, $i_z$ are the input text, scene and image respectively, $i_x \in \mathbb{N}^{d_x}$, $d_x$ is the length of the input text sequence, $i_y \in \mathbb{R}^{h_y \times w_y \times m}$, $i_z \in \mathbb{R}^{h_z \times w_z \times 3}$, $h_y$, $w_y$, $h_z$, $w_z$ are the height and width dimensions of the scene and image inputs respectively. BPE is the Byte Pair Encoding encoder, $t_x$, $t_y$, $t_z$ are the text, scene and image input tokens respectively, and t is the complete token sequence.

The embodiments disclosed herein further employ classifier-free guidance. Classifier-free guidance is the process of guiding an unconditional sample in the direction of a conditional sample. To support unconditional sampling we may fine-tune the transformer while randomly replacing the text prompt with padding tokens with a probability of $p_{CF}$. In particular embodiments, the one or more text tokens may be associated with a conditional token stream conditioned on the text input. The computing system may further generate an unconditional token stream conditioned on an empty text stream initialized with padding tokens. Accordingly, generating the one or more predicted image tokens may be based on the conditional token stream and the unconditional token stream. As aforementioned, the one or more machine-learning models may comprise a transformer neural network model. In particular embodiments, the computing system may determine, by the transformer neural network model, a plurality of first probabilities associated with a plurality of predicted image tokens based on the conditional token stream and the one or more scene tokens. The computing system may then determine, by the transformer neural network model, a plurality of second probabilities associated with a plurality of predicted image tokens based on the unconditional token stream and the one or more scene tokens. The computing system may further determine the one or more predicted image tokens from the plurality of predicted image tokens based on the plurality of first and second probabilities. As an example and not by way of limitation, the probabilities based on conditional stream may deduct the probabilities based on unconditional stream to obtain the probabilities for the predicted image tokens. In particular embodiments, while generating predicted image tokens, the computing system may additional generate predicted scene tokens in case a user may want to use them for other purposes.

During inference, we may generate two parallel token streams: a conditional token stream conditioned on text, and an unconditional token stream conditioned on an empty text stream initialized with padding tokens. For transformers, we may apply classifier-free guidance on logit scores:

$$\text{logits}_{cond} = T(t_y, t_z|t_x),  \quad (5)$$

$$\text{logits}_{uncond} = T(t_y, t_z|\emptyset),  \quad (6)$$

$$\text{logits}_{cf} = \text{logits}_{uncond} + \alpha_c \cdot (\text{logits}_{cond} - \text{logits}_{uncond}),  \quad (7)$$

where $\emptyset$ is the empty text stream, $\text{logits}_{uncond}$ are logit scores outputted by the conditioned token stream, $\text{logits}_{uncond}$ are logit scores outputted by the unconditioned token stream, $\alpha_c$ is the guidance scale, and $\text{logits}_{cf}$ is the guided logit scores used to sample the next scene or image token. T is an autoregressive transformer based on the architecture of GPT-3. Note that since we use an autoregressive transformer, we may use $\text{logits}_{cf}$ to sample once and feed the same token (image or scene) to the conditional and unconditional stream. As discussed above, the computing system may calculate one or more conditional logit scores based on the conditional token stream. The computing system may then calculate one or more unconditional logit scores based on the unconditional token stream. The computing system may further calculate one or more guided logit scores based on the one or more conditional logit scores and the one or more unconditional logit scores. Correspondingly, generating the one or more predicted image tokens may be based on the one or more guided logit scores.

An extensive set of experiments is provided to establish the visual and numerical validity of the our different contributions. Our model may achieve state-of-the-art results in human-based and numerical metric comparisons. Additionally, we demonstrate new creative capabilities possible with this method's new form of controllability. Finally, to better assess the effect of each contribution, an ablation study is provided.

Experiments were performed with a 4 billion parameter transformer, generating a sequence of 256 text tokens, 256 scene tokens, and 1024 image tokens, that were then decoded into an image with a resolution of 256×256 or 512×512 pixels (depending on the model of choice).

The scene-based transformer may be trained on a union of various publicly available datasets, amounting to 35 million text-image pairs. VQ-SEG and VQ-IMG may be trained on a combination of a few publicly available datasets.

The goal of text-to-image generation may be to generate high-quality and text-aligned images from a human perspective. Different metrics have been suggested to mimic the human perspective, where some may be considered more reliable than others. The embodiments disclosed herein consider human evaluation the highest authority when evaluating image quality and text-alignment and rely on FID to increase evaluation confidence and handle cases where human evaluation is not applicable. The embodiments disclosed herein do not use IS as it has been noted to be insufficient for model evaluation.

The task of text-to-image generation may not contain absolute ground-truths, as a specific text description may apply to multiple images and vice versa. This may constrain evaluation metrics to evaluate distributions of images, rather than specific images, thus we may employ FID as our secondary metric.

Figure 4:
FIG. 4 illustrates example qualitative comparison with conventional work.

The embodiments disclosed herein compare our results with several state-of-the-art methods using the FID metric and human evaluators (AMT) when possible. DALL-E may provide strong zero-shot capabilities, similarly employing an autoregressive transformer with VQ-VAE tokenization. The embodiments disclosed herein train a re-implementation of DALL-E with 4 billion parameters to enable human evaluation and fairly compare both methods employing an identical VQ method (VQGAN). GLIDE may demonstrate vastly improved results over DALL-E, adopting a diffusion-based approach with classifier-free guidance. The embodiments disclosed herein additionally provide an FID comparison with CogView, LAFITE, XMC-GAN, DM-GAN(+ CL), DF-GAN, DM-GAN, DF-GAN and, AttnGAN. FIG. 4 illustrates example qualitative comparison with conventional work. The first row corresponds to XMC-GAN. The second row corresponds to DALL-E. The third row corresponds to CogView. The fourth row corresponds to GLIDE. The last row corresponds to our method. FIG. 4 shows the qualitative advantage of our method.

Human evaluation with previous methods is provided in Table 1. In each instance, human evaluators are required to choose between two images generated by the two models being compared. The two models are compared in three aspects: (i) image quality, (ii) photorealism (which image appears more real), and (iii) text alignment (which image best matches the text). Each question is surveyed using 500 image pairs, where 5 different evaluators answer each question, amounting to 2500 instances per question for a given comparison. The embodiments disclosed herein compare our 256×256 model with our re-implementation of DALL-E and CogView's 256×256 model. CogView's 512×512 model is compared with our corresponding model. Results are presented as a percentage of majority votes in favor of our method when comparing between a certain model and ours. Compared with the three methods, ours achieves significantly higher favorability in all aspects.

TABLE 1

Comparison with previous work (FID and human preference)

| Model | FID↓ | FID↓ (filt.) | Image quality | Photo-realism | Text alignment |
|---|---|---|---|---|---|
| AttnGAN | 35.49 | — | — | — | — |
| DM-GAN | 32.64 | — | — | — | — |
| DF-GAN | 21.42 | — | — | — | — |
| DM-GAN + CL | 20.79 | — | — | — | — |
| XMC-GAN | 9.33 | — | — | — | — |
| DALL-E | — | 34.60 | 81.8% | 81.0% | 65.9% |
| CogView256 | — | 32.20 | 92.2% | 94.2% | 92.2% |
| CogView512 | — | 36.53 | 91.1% | 88.2% | 87.8% |
| LAFITE | 8.12 | 26.94 | — | — | — |
| GLIDE | — | 12.24 | — | — | — |
| Ours256 | 7.55 | 11.84 | — | — | — |
| Ground-truth | 2.47 | — | — | — | — |

FID is calculated over a subset of 30 k images generated from the validation set text prompts with no re-ranking of a public dataset. The evaluated models are divided into two groups: trained with and without (denoted as filtered) the training set. In both scenarios our model achieves the lowest FID, correlating with visual samples and human evaluation. In addition, we provide a loose practical lower-bound (denoted as ground-truth), calculated between the training and validation subsets of the public dataset. As FID results are approaching small numbers, it may be interesting to get an idea of a possible practical lower-bound.

Figure 5:
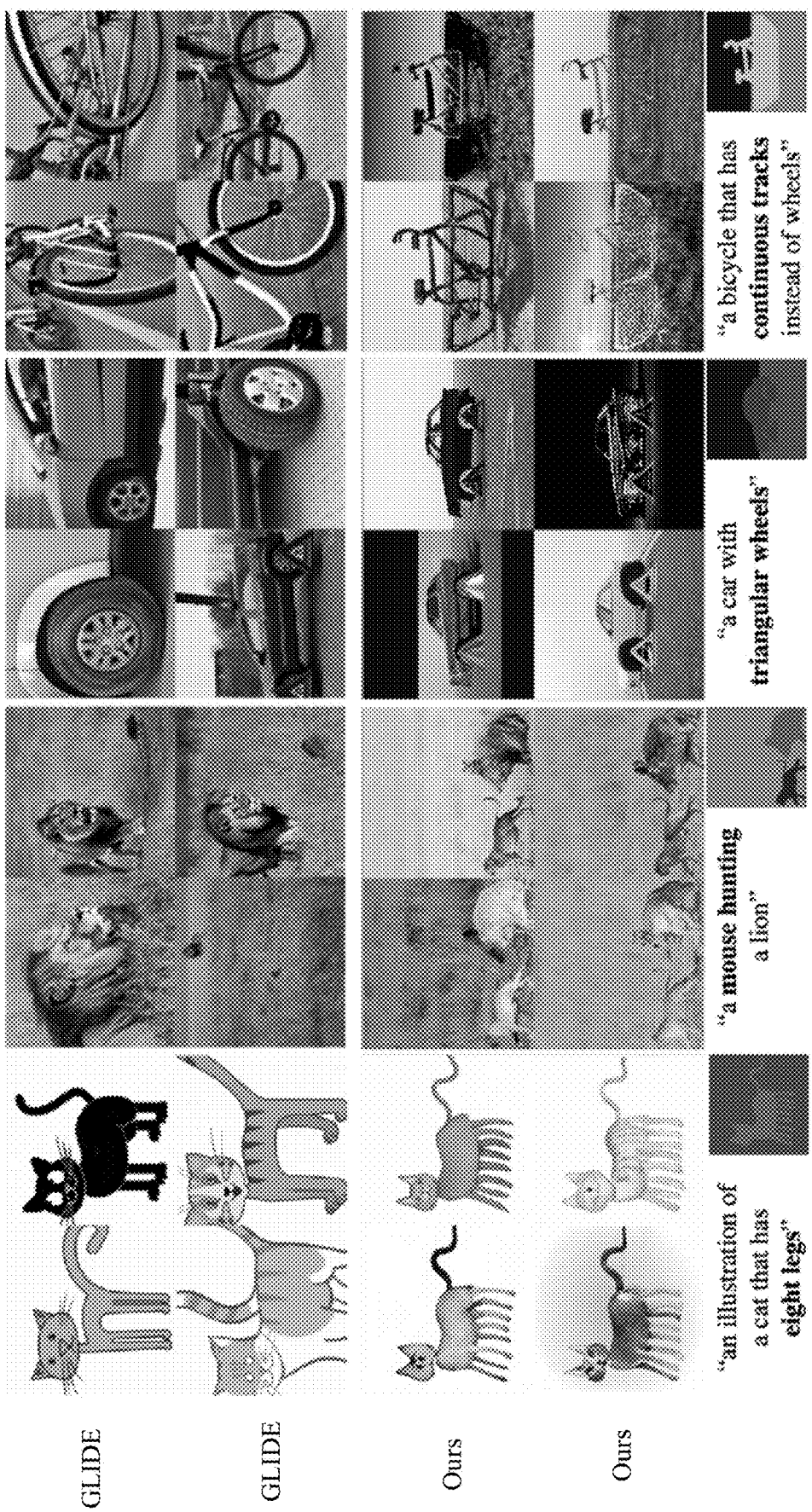
FIG. 5 illustrates an example comparison showing our method overcoming out-of-distribution text prompts with scene control.

Methods that generate from text inputs only may be more confined to generate within the training distribution. Unusual objects and scenarios may be challenging to generate, as certain objects may be strongly correlated with specific structures, such as cats with four legs or cars with round wheels. The same may be true for scenarios, e.g., "a mouse hunting a lion" which may be most likely not a scenario easily found within the dataset. In particular embodiments, the text input may comprise a description of an unusual scene not existing in reality. The generated image by the embodiments disclosed herein may depict the unusual scene not existing in reality. FIG. 5 illustrates an example comparison showing our method overcoming out-of-distribution text prompts with scene control. Using scenes in the form of simple sketches as inputs, we may be able to attend to these uncommon objects and scenarios, despite the fact that some objects may not exist as categories in our scene (such as the mouse and lion). By introducing simple scene sketches (bottom right) as additional inputs, our method may be able to overcome unusual objects and scenarios presented as failure cases in conventional methods. We may solve the category gap by using categories that may be close in certain aspects (elephant instead of mouse, cat instead of lion). In practice, for non-existent categories several categories may be used instead.

Figure 6:
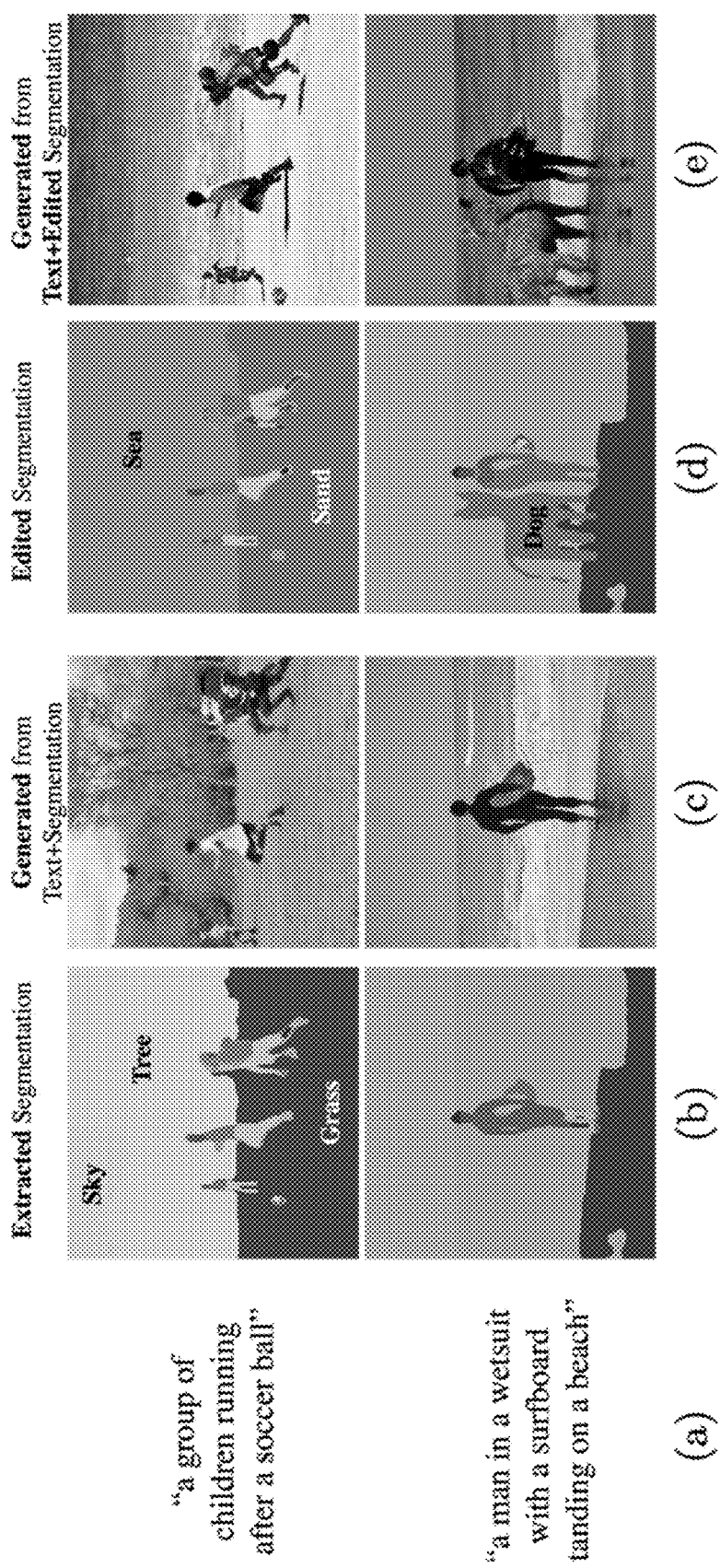
FIG. 6 illustrates example generate images through edited scenes.
Figure 7:
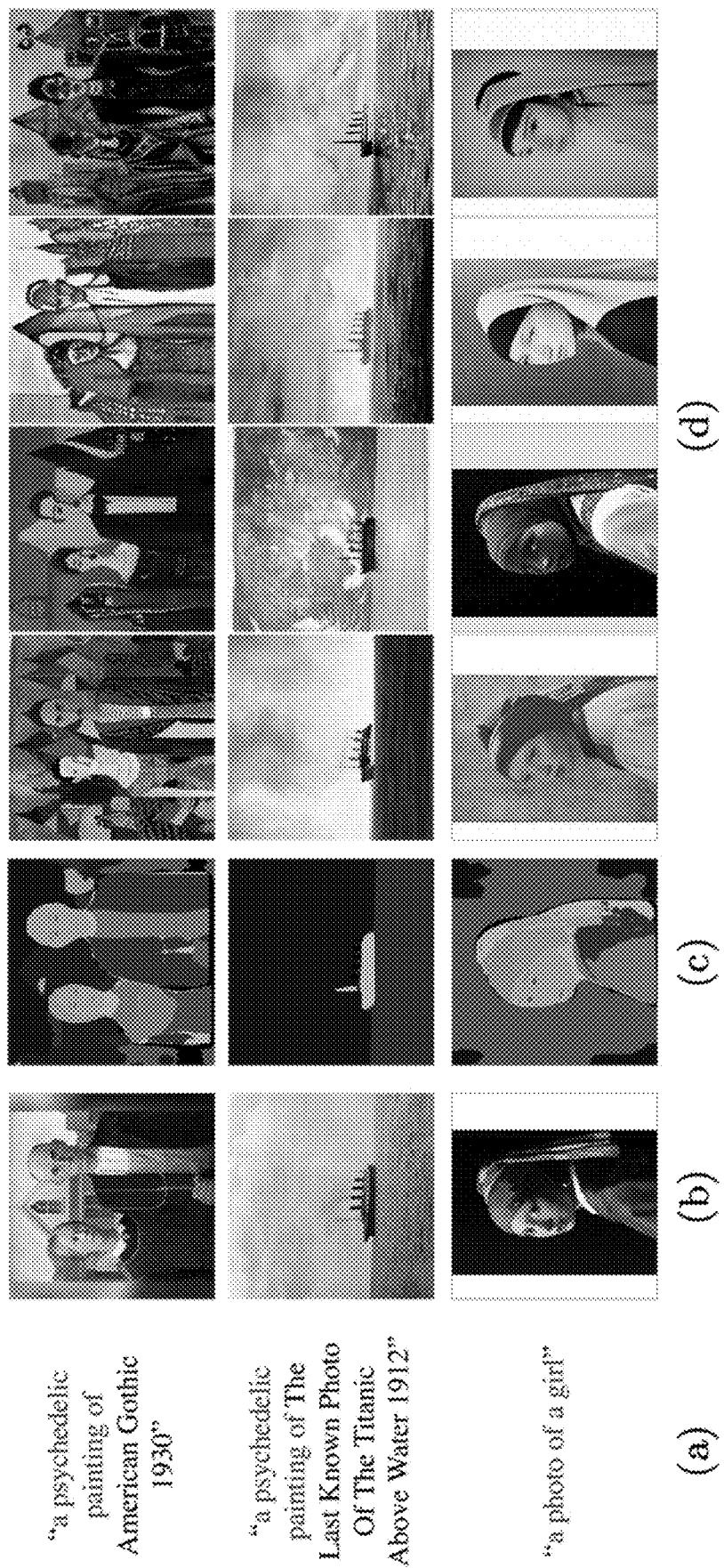
FIG. 7 illustrates example generations of new image interpretations through text editing and anchor scenes.
Figure 8B:
FIGS. 8A-8J illustrate an example generation of a story.
Figure 8A:
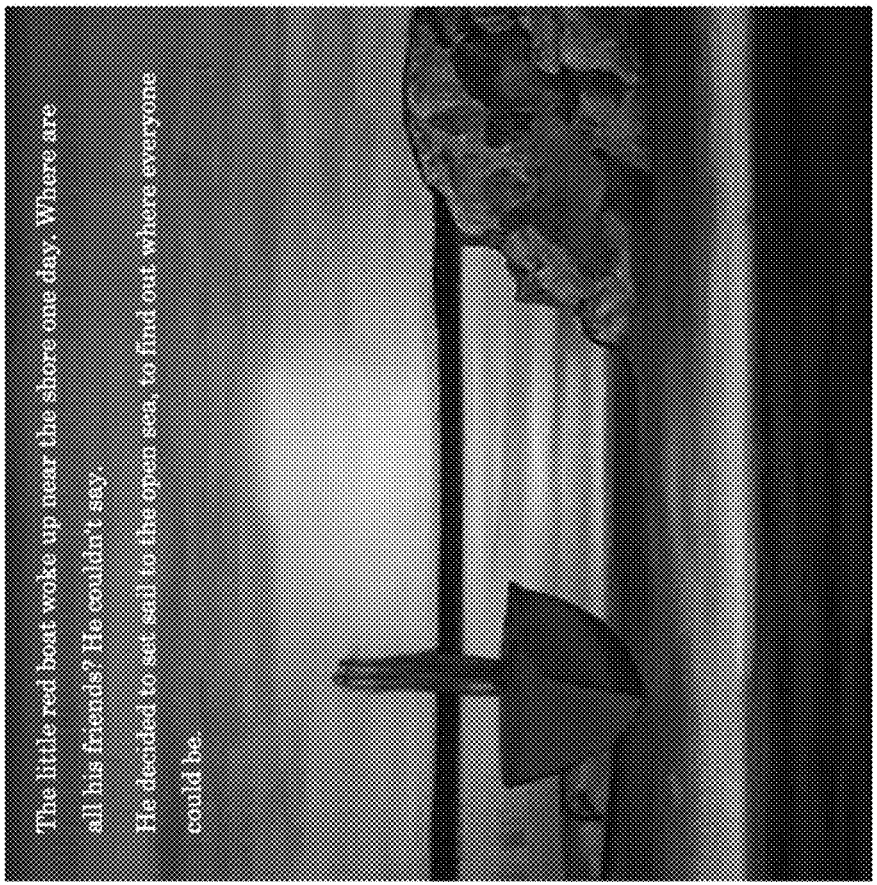
Figure 8D:
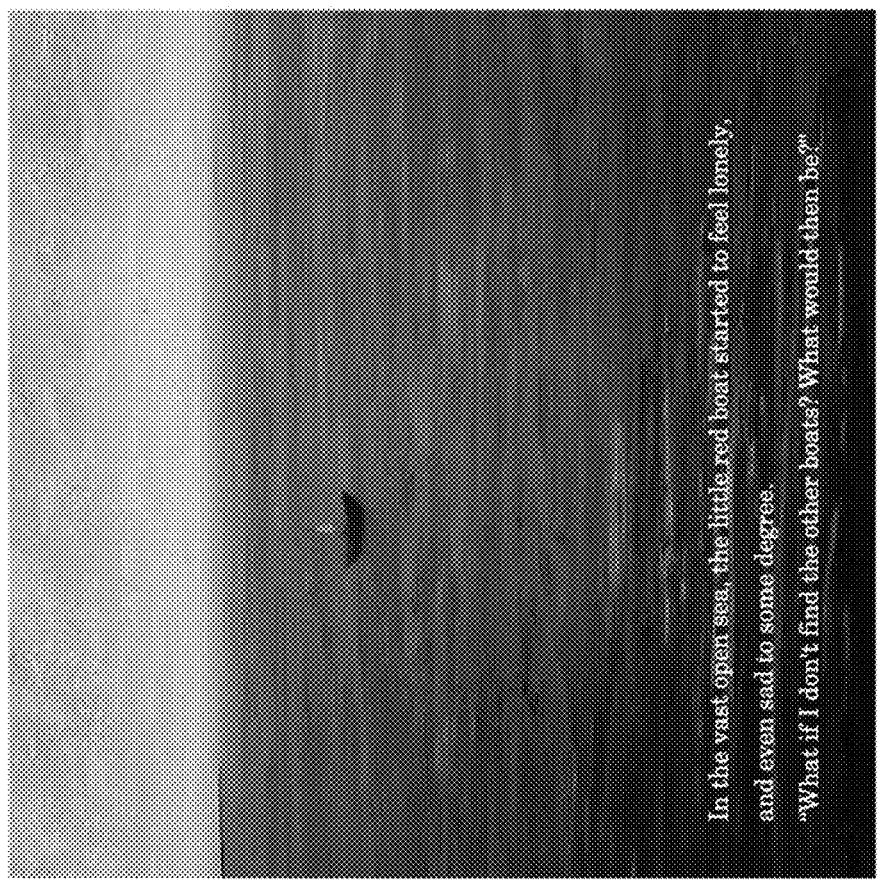
Figure 8C:
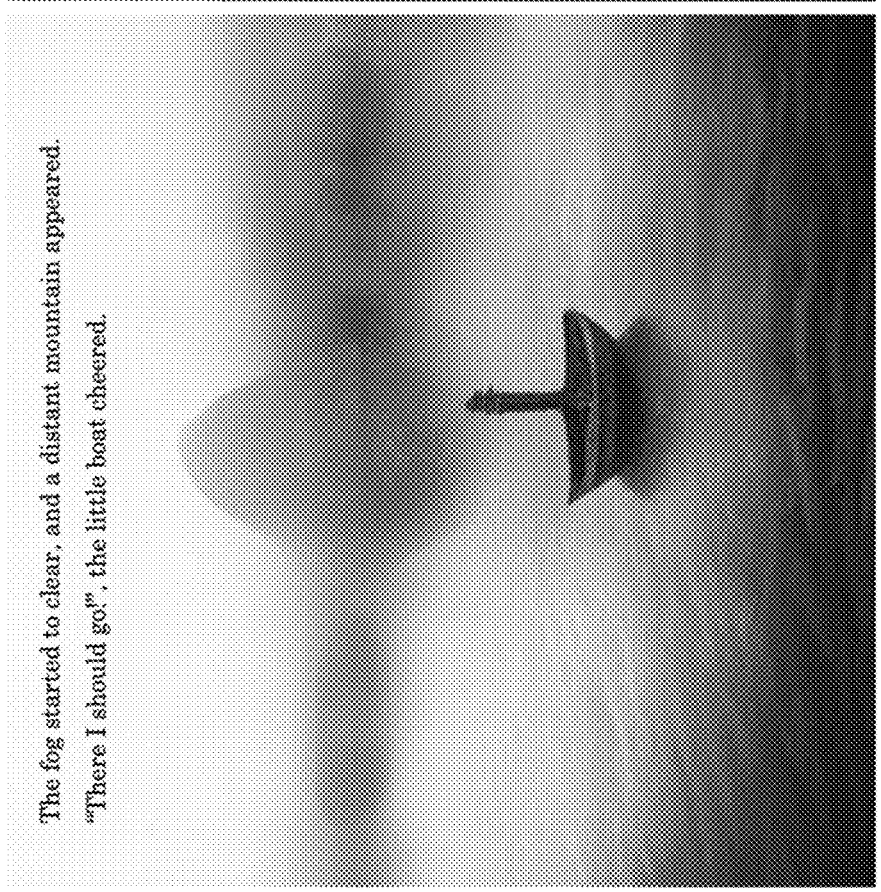
Figure 8F:
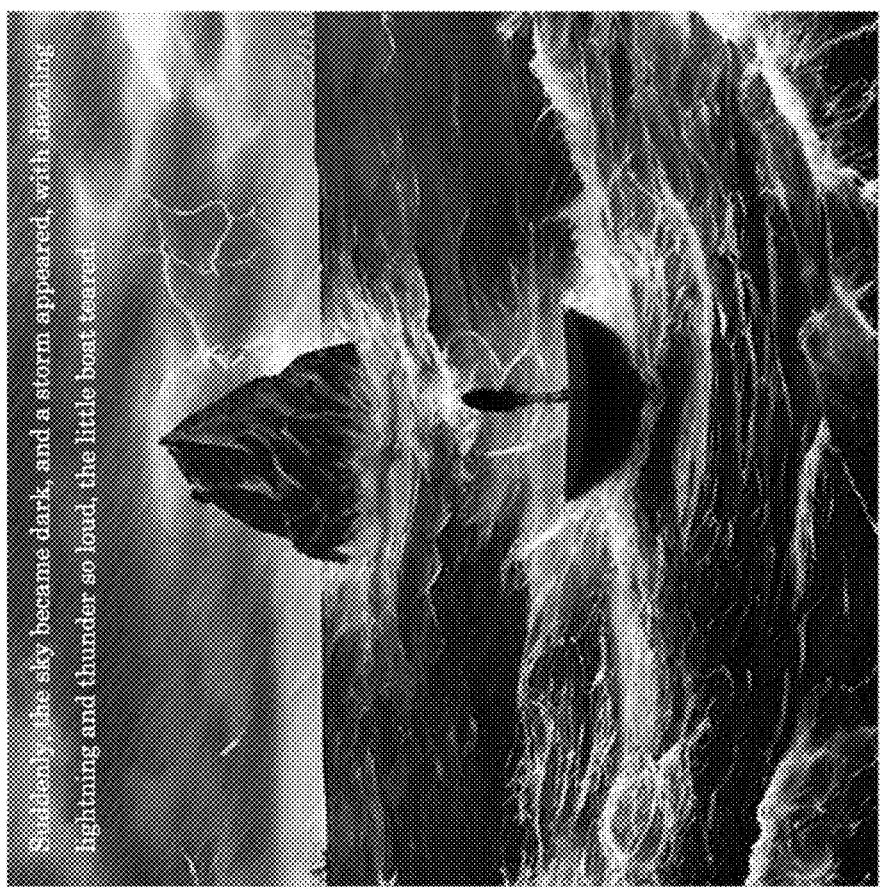
Figure 8E:
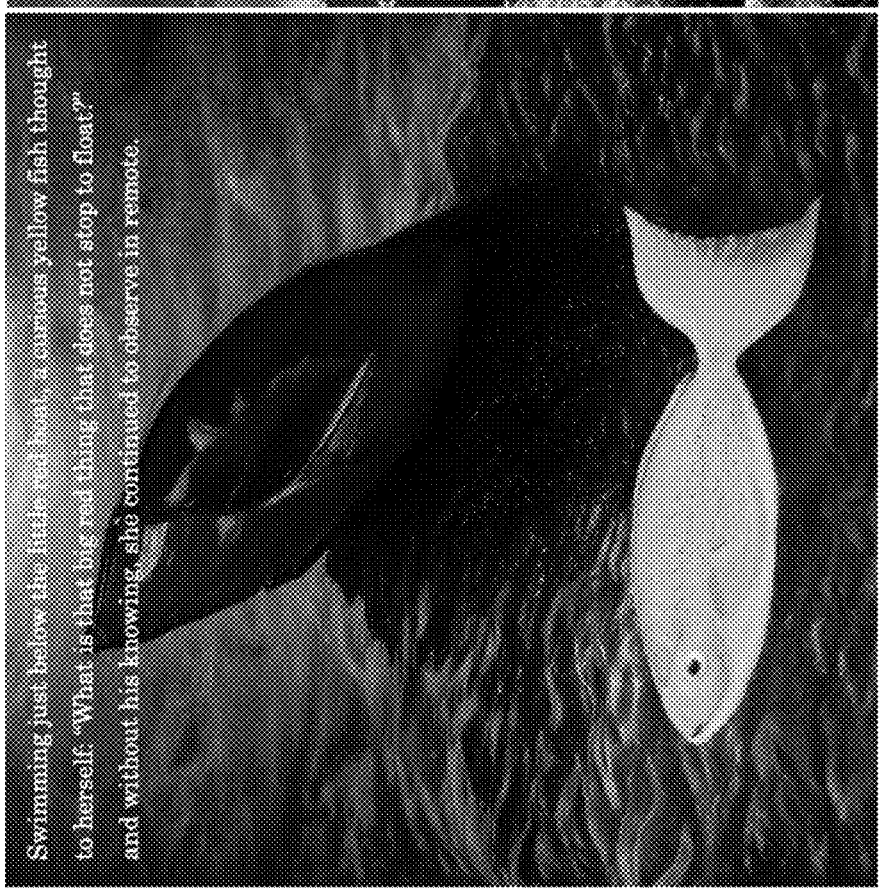
Figure 8H:
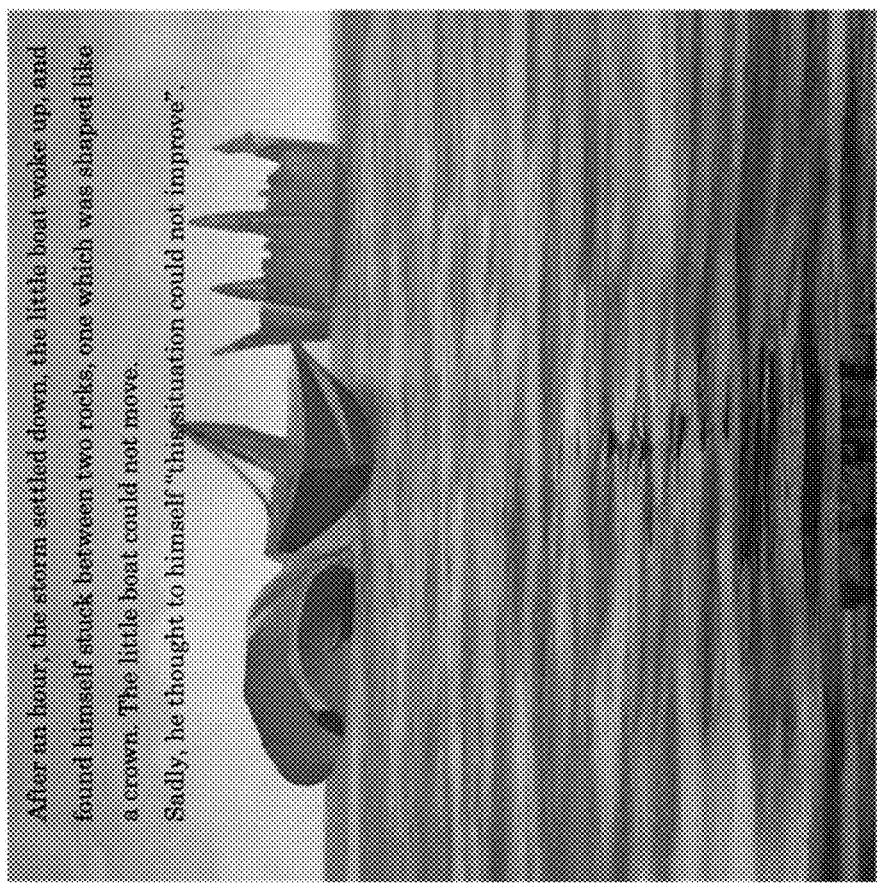
Figure 8G:
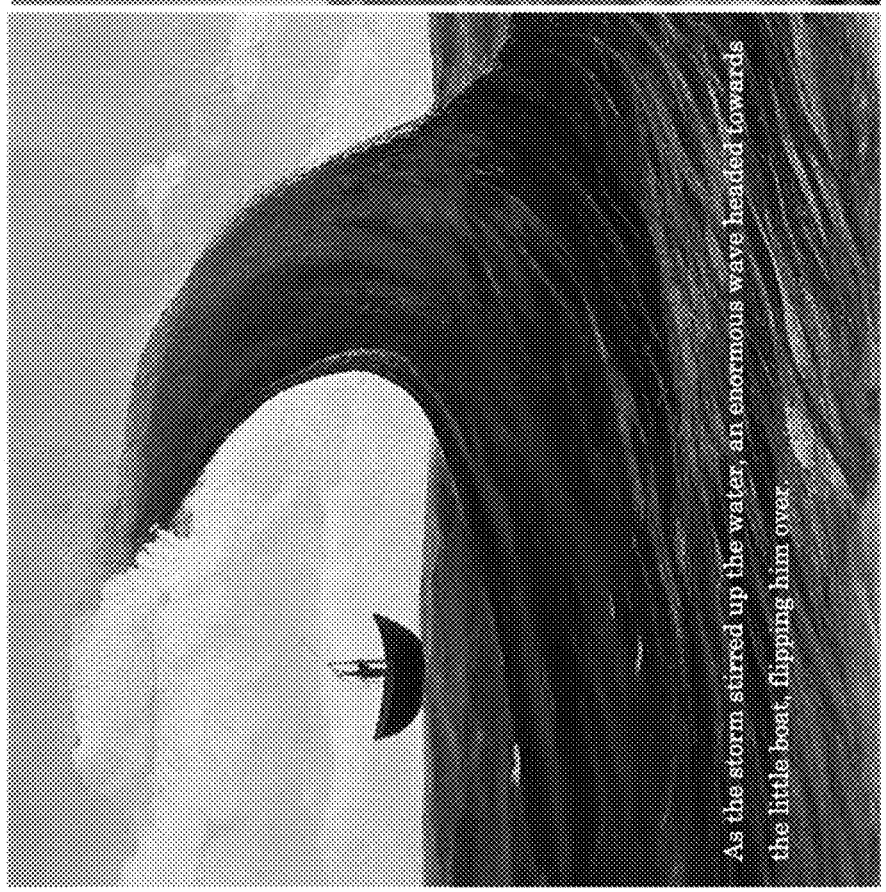
Figure 8J:
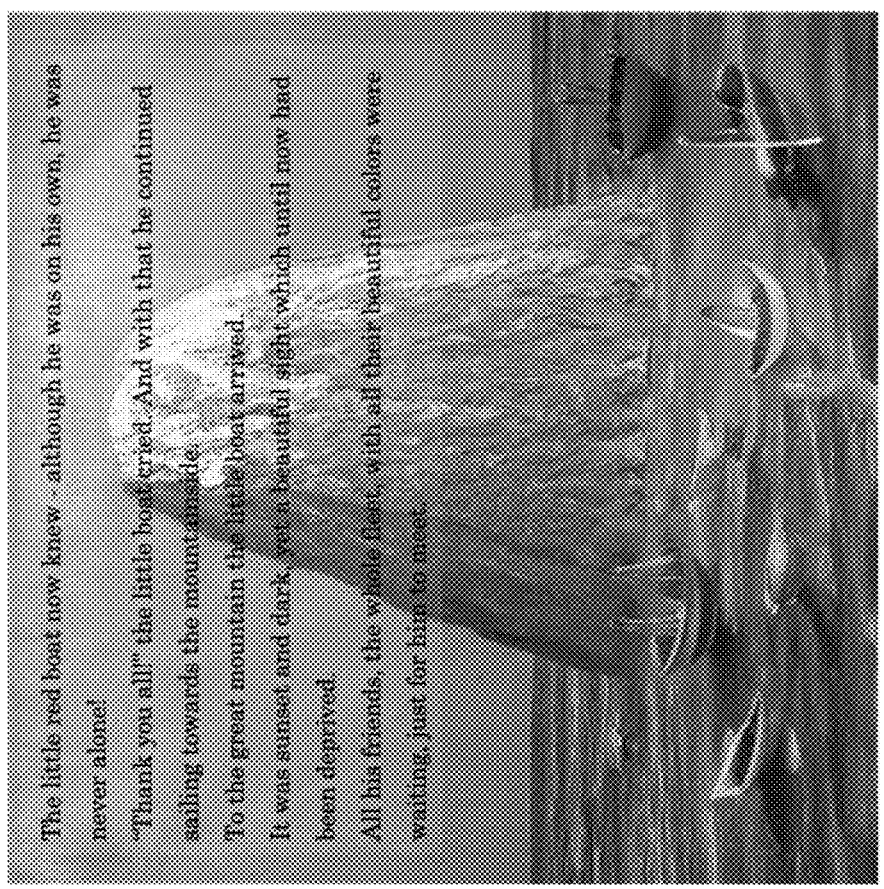
Figure 8I:
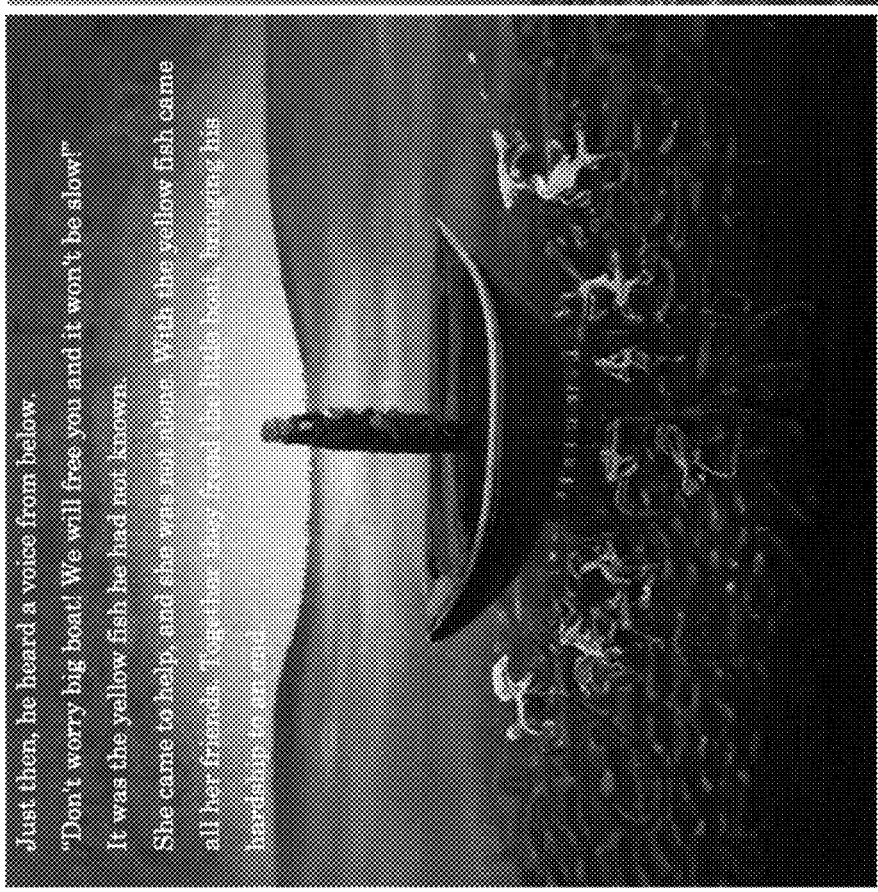

FIG. 6 illustrates example generate images through edited scenes. FIG. 7 illustrates example generations of new image interpretations through text editing and anchor scenes. The embodiments disclosed herein may have scene controllability. Samples are provided in FIGS. 1A-1B and FIGS. 5-7 with both our 256×256 and 512×512 models. In addition to generating high fidelity images from text only, we demonstrate the applicability of scene-wise image control and maintaining consistency between generations.

Rather than editing certain regions of images as demonstrated by conventional work, the embodiments disclosed herein introduce new capabilities of generating images from existing or edited scenes. In FIG. 6, two scenarios are considered. In both scenarios the semantic segmentation is extracted from an input image and used to re-generate an image conditioned on the input text. In particular embodiments, the one or more semantic segmentations may be associated with one or more labeled categories. The computing system may receive one or more edits of one or more of the labeled categories. The computing system may further update the image based on the one or more edits. In particular embodiments, the updated image may depict a scene based on the edited labeled categories. In the top row of FIG. 6, the scene is edited, replacing the 'sky' and 'tree' categories with 'sea', and the 'grass' category with 'sand', resulting in a generated image adhering to the new scene. A simple sketch of a giant dog is added to the scene in the bottom row, resulting in a generated image corresponding to the new scene without any change in text. Specifically, for an input text (a) and the segmentations extracted from an input image (b), our model may re-generate the image (c) or edit the segmentations (d) by replacing classes (top) or adding classes (bottom), generating images with new context or content (c).

In particular embodiments, the computing system may receive one or more edits of the text input. The computing system may further generate, based on the one or more edits of the text input and the scene input, one or more newly interpreted images for the existing image. FIG. 7 demonstrates the ability to generate new interpretations of existing images and scenes. After extracting the semantic segmentation from a given image, we may re-generate the image conditioned on the input scene and edited text. Specifically, for an input text (a) and image (b), we first extract the semantic segmentation (c), we may then re-generate new images (d) given the input segmentation and edited text.

To demonstrate the applicability of harnessing scene control for story illustrations, we wrote a children story, and illustrated it using our method. FIGS. 8A-8J illustrate an example generation of a story. The main advantages of using simple sketches as additional inputs in this case, are (i) that authors can translate their ideas into paintings or realistic images, while being less susceptible to the "randomness" of text-to-image generation, in which the embodiments disclosed herein may follow the concept and direction the author has in mind, and (ii) improved consistency between generation throughout the story. In particular embodiments, our method may further generate several flavors using the same sketches, by changing the text prompt.

An ablation study of human preference and FID is provided in Table 2 to assess the effectiveness of our different contributions. Settings in both studies are similar to the comparison made with conventional work. Each row corresponds to a model trained with the additional element, compared with the model without that specific addition for human preference. We note that while the lowest FID is attained by the 256×256 model, human preference favors the 512×512 model with object-aware training, particularly in quality. Furthermore, we re-examine the FID of the best model, where the scene is given as an additional input, to gain a better notion of the gap from the lower-bound (Table 1).

TABLE 2

Ablation study (FID and human preference).

| Model | FID↓ | Image quality | Photorealism | Text alignment |
|---|---|---|---|---|
| Base | 18.01 | — | — | — |
| +Scene tokens | 19.16 | 57.3% | 65.3% | 58.3% |

TABLE 2-continued

Ablation study (FID and human preference).

| Model | FID↓ | Image quality | Photorealism | Text alignment |
|---|---|---|---|---|
| +Face-aware | 14.45 | 63.6% | 59.8% | 57.4% |
| +CF | 7.55 | 76.8% | 66.8% | 66.8% |
| +Obj-aware$_{512}$ | 8.70 | 62.0% | 53.5% | 52.2% |
| +CF with scene input | 4.69 | — | — | — |

FID is calculated over a subset of 30 k images generated from the MS-COCO validation set text prompts. Human evaluation is shown as a percentage of majority votes in favor of the added element compared to the previous model.

Figure 9:
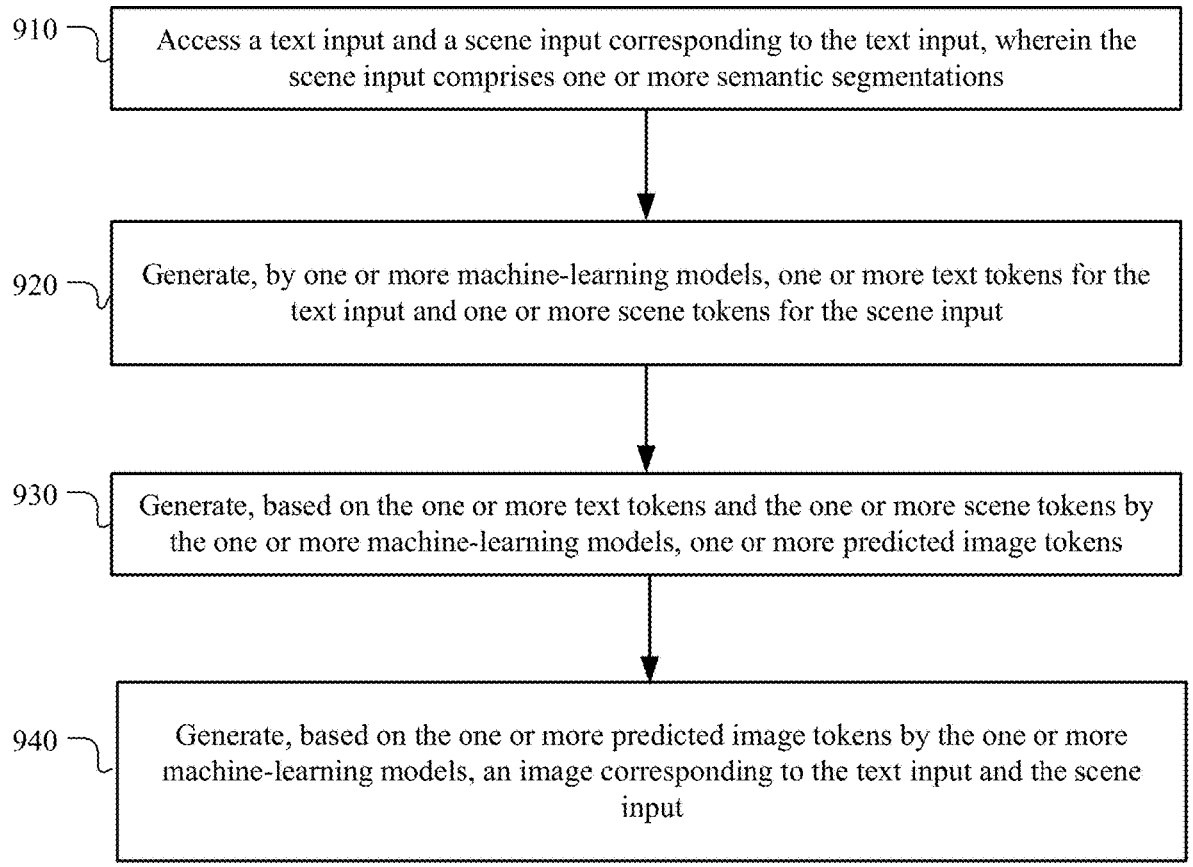
FIG. 9 illustrates an example method for text-to-image generation with human priors.

FIG. 9 illustrates an example method 900 for text-to-image generation with human priors. The method may begin at step 910, where the computing system may access a text input and a scene input corresponding to the text input, wherein the scene input comprises one or more semantic segmentations. At step 920, the computing system may generate, by one or more machine-learning models, one or more text tokens for the text input and one or more scene tokens for the scene input. At step 930, the computing system may generate, based on the one or more text tokens and the one or more scene tokens by the one or more machine-learning models, one or more predicted image tokens. At step 940, the computing system may generate, based on the one or more predicted image tokens by the one or more machine-learning models, an image corresponding to the text input and the scene input. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for text-to-image generation with human priors including the particular steps of the method of FIG. 9, this disclosure contemplates any suitable method for text-to-image generation with human priors including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
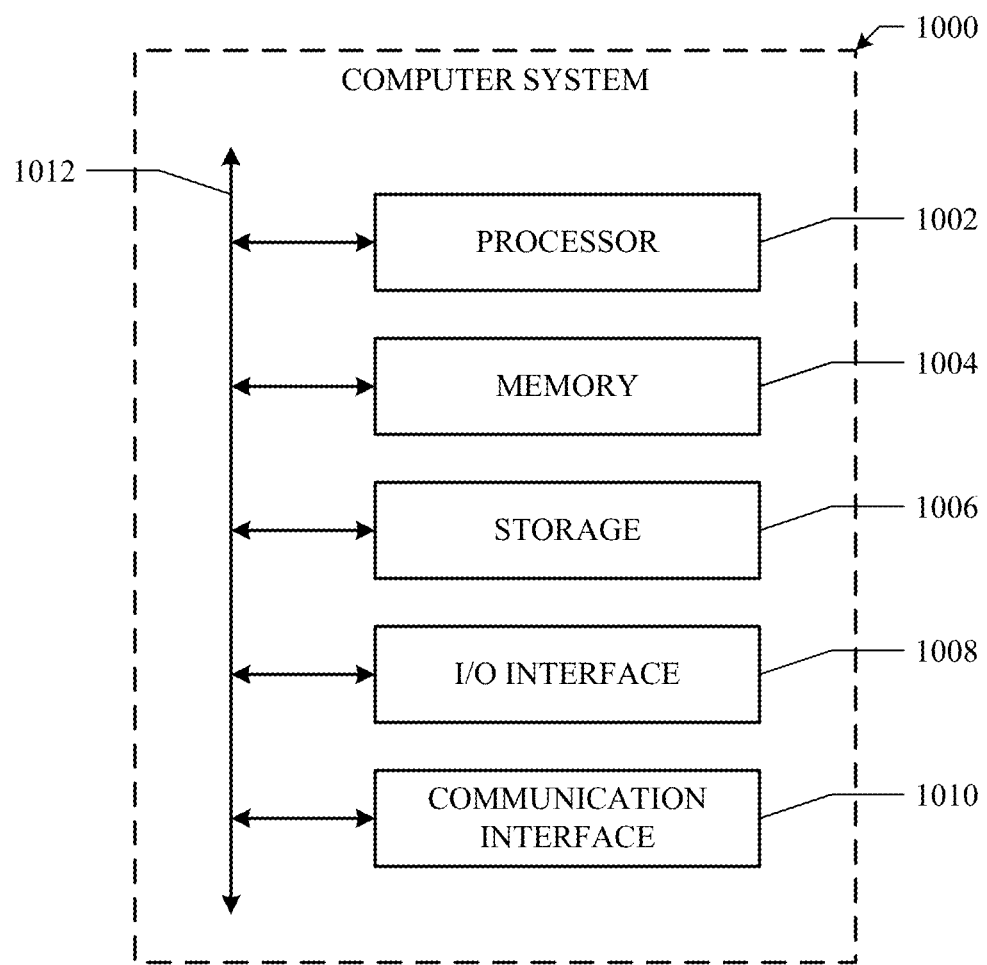
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate.

Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   accessing a text input and a scene input corresponding to the text input, wherein the scene input comprises one or more semantic segmentations;
   generating, by one or more machine-learning models, one or more text tokens for the text input and one or more scene tokens for the scene input;
   generating, based on the one or more text tokens and the one or more scene tokens by the one or more machine-learning models, one or more predicted image tokens; and
   generating, based on the one or more predicted image tokens by the one or more machine-learning models, an image corresponding to the text input and the scene input.

2. The method of claim 1, wherein the one or more machine-learning models comprise one or more of a text encoder, a scene encoder, an image encoder, a transformer neural network model, or an image decoder.

3. The method of claim 1, wherein the one or more semantic segmentations are associated with one or more categories based on one or more of panoptic, human, or face.

4. The method of claim 3, wherein the one or more scene tokens are based on a plurality of channels, and wherein a number of the plurality of channels is based on a number of categories based on panoptic, a number of categories based on human, a number of categories based on face, and an edge channel corresponding to a map of edges separating the one or more semantic segmentations.

5. The method of claim 1, wherein the one or more text tokens are associated with a conditional token stream conditioned on the text input, wherein the method further comprises:
   generating an unconditional token stream conditioned on an empty text stream initialized with padding tokens, and
   wherein the generating the one or more predicted image tokens is based on the conditional token stream and the unconditional token stream.

6. The method of claim 5, wherein the one or more machine-learning models comprise a transformer neural network model, wherein the method further comprises:
   determining, by the transformer neural network model, a plurality of first probabilities associated with a plurality of predicted image tokens based on the conditional token stream and the one or more scene tokens;
   determining, by the transformer neural network model, a plurality of second probabilities associated with the plurality of predicted image tokens based on the unconditional token stream and the one or more scene tokens; and
   determining the one or more predicted image tokens from the plurality of predicted image tokens based on the plurality of first probabilities and the plurality of second probabilities.

7. The method of claim 5, further comprising:
   calculating one or more conditional logit scores based on the conditional token stream;
   calculating one or more unconditional logit scores based on the unconditional token stream; and
   calculating one or more guided logit scores based on the one or more conditional logit scores and the one or more unconditional logit scores, and
   wherein the generating the one or more predicted image tokens is based on the one or more guided logic scores.

8. The method of claim 1, further comprising:
   generating the one or more semantic segmentations from an existing image.

9. The method of claim 8, wherein the generating the one or more semantic segmentations is based on a segmentation model, and wherein the segmentation model is trained based on one or more of a weighted binary cross-entropy face loss applied over segmentation face parts categories or a semantic segmentation edge map comprising face parts edges.

10. The method of claim 8, wherein the one or more semantic segmentations are associated with one or more labeled categories, and wherein the method further comprises:

receiving one or more edits of one or more of the labeled categories; and updating the image based on the one or more edits, wherein the updated image depicts a scene based on the edits of the one or more of the labeled categories.

11. The method of claim 8, further comprising:

receiving one or more edits of the text input; and generating, based on the one or more edits of the text input and the scene input, one or more newly interpreted images for the existing image.

12. The method of claim 1, wherein the one or more semantic segmentations are created by a user.

13. The method of claim 1, wherein the generating the one or more predicted image tokens is based on an image encoder, wherein the generating the image corresponding to the text input and the scene input is based on an image decoder, and wherein the image encoder or the image decoder is trained based on a feature-matching loss over activations of a pre-trained face-embedding network comparing between reconstructed face crops and ground-truth face crops.

14. The method of claim 1, wherein the generating the one or more predicted image tokens is based on an image encoder, wherein the generating the image corresponding to the text input and the scene input is based on an image decoder, and wherein the image encoder or the image decoder is trained based on a feature-matching loss over activations of a pre-trained object-recognition network comparing between reconstructed object crops and ground-truth object crops.

15. The method of claim 1, wherein the text input comprises a description of an unusual scene not existing in reality, and wherein the generated image depicts the unusual scene not existing in reality.

16. One or more computer-readable non-transitory storage media embodying software that is operable when executed to:

access a text input and a scene input corresponding to the text input, wherein the scene input comprises one or more semantic segmentations;

generate, by one or more machine-learning models, one or more text tokens for the text input and one or more scene tokens for the scene input;

generate, based on the one or more text tokens and the one or more scene tokens by the one or more machine-learning models, one or more predicted image tokens; and generate, based on the one or more predicted image tokens by the one or more machine-learning models, an image corresponding to the text input and the scene input.

17. A system comprising: one or more processors; and a non-transitory memory coupled to the processors comprising instructions executable by the processors, the processors operable when executing the instructions to:

access a text input and a scene input corresponding to the text input, wherein the scene input comprises one or more semantic segmentations;

generate, by one or more machine-learning models, one or more text tokens for the text input and one or more scene tokens for the scene input;

generate, based on the one or more text tokens and the one or more scene tokens by the one or more machine-learning models, one or more predicted image tokens; and generate, based on the one or more predicted image tokens by the one or more machine-learning models, an image corresponding to the text input and the scene input.

* * * * *